United States Patent [19]
Miller et al.

[11] 3,788,098
[45] Jan. 29, 1974

[54] END CAP FOR FLEXIBLE SHAFT COUPLINGS AND METHOD

[75] Inventors: Arthur W. Miller, Golden; Robert E. Stuemky, Elizabeth; George E. Morse, Denver, all of Colo.

[73] Assignee: The Gates Rubber Company, Denver, Colo.

[22] Filed: July 12, 1972

[21] Appl. No.: 271,096

[52] U.S. Cl. .................. 64/11 R, 64/2 R, 64/3 R, 64/27 NM, 64/11 B
[51] Int. Cl. ............................................. F16d 3/28
[58] Field of Search...64/15 C, 2 R, 3, 4, 11 R, 27 NM, 64/11 B

[56] References Cited
UNITED STATES PATENTS

| | | | |
|---|---|---|---|
| 2,174,010 | 9/1939 | Patterson | 64/11 |
| 2,099,915 | 11/1937 | Weatherhead | 64/3 |
| 2,596,335 | 5/1952 | Kessler | 64/2 |
| 2,797,562 | 7/1957 | Forgash | 64/11 |
| 2,994,213 | 8/1961 | Arnold et al. | 64/11 |

Primary Examiner—Benjamin W. Wyche
Assistant Examiner—Randall Heald
Attorney, Agent, or Firm—H. W. Oberg, Jr.; Raymond Fink; Curtis H. Castleman, Jr.

[57] ABSTRACT

An end cap for flexible shaft couplings of the tubularly shaped flexible element type that includes a flanged tapered hub having a plurality of axial grooves, and a corrugated outer sleeve axially aligned with the hub and having an end portion attached to the flange.

10 Claims, 4 Drawing Figures

PATENTED JAN 29 1974        3,788,098

END CAP FOR FLEXIBLE SHAFT COUPLINGS AND METHOD

BACKGROUND OF THE INVENTION

The invention relates to flexible shaft couplings of the tubularly shaped flexible element type, but more particularly, the invention relates to end caps for transmitting torque to and from the flexible element.

End caps are used in flexible couplings as means for transferring torque to or from a rotating shaft and a tubularly shaped flexible element. An example of such an end cap is proffered in U.S. Pat. No. 3,628,352. Although prior art end caps are substantially satisfactory for the purpose of transferring torque to a flexible element, they are somewhat expensive to manufacture or assemble, and they also inhibit the life of the flexible element by introducing localized stress concentrations therein.

SUMMARY OF THE INVENTION

The end cap of the invention includes a flanged tapered hub having a plurality of axially aligned grooves. A corrugated sleeve is arranged coaxially with the hub and has one end portion attached to or crimped around the flange. The corrugated sleeve is cold formed from a tube.

Accordingly, an object of the invention is to provide an end cap that is economical to manufacture.

Another object of the invention is to provide an end cap for a flexible element which minimizes localized stress concentrations therein.

These and other objects or advantages of the invention will become more apparent by reference to the drawings and description thereof wherein.

DESCRIPTION OF PREFERRED EMBODIMENTS

Figures 1, 2, 3, 4:
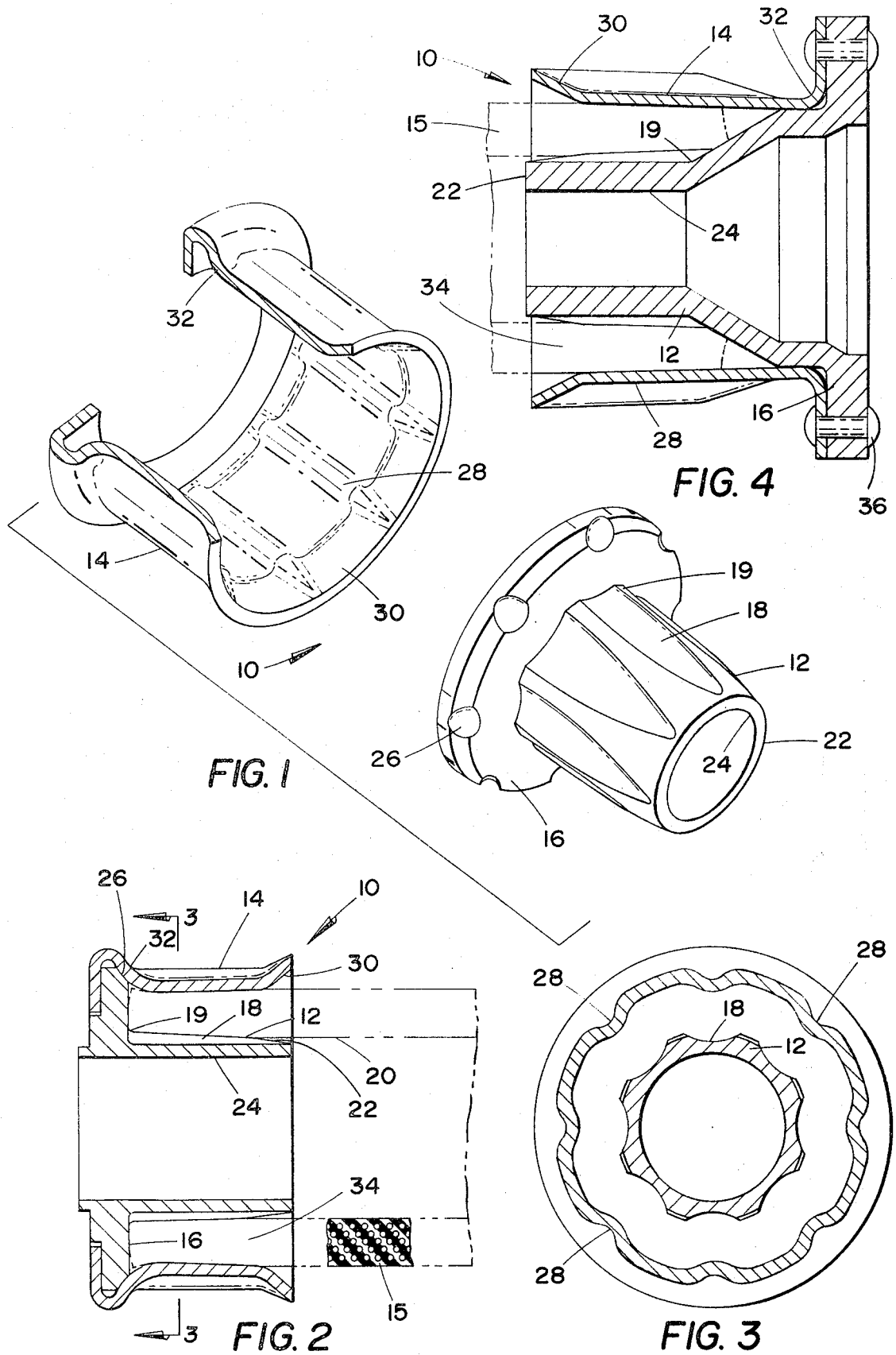
FIG. 1 is an exploded isometric view in partial cutaway of the invention.
FIG. 2 is an axial cross sectional view of the invention as installed on a flexible element.
FIG. 3 is a view taken along the line 3—3 of FIG. 2.
FIG. 4 is a view similar to FIG. 2 showing and alternate form of the invention.

In accordance with the invention, an end cap is provided for transmitting torque to and from a flexible element. Referring to the drawings the end cap 10 includes a hub 12 and sleeve 14 which sandwiches a tubularly shaped flexible element 15. The hub is flanged 16 at one end portion for adaption to the sleeve 14. The hub 12 is convergently tapered from near the flange and includes a plurality of generally axially extending grooves 18. The root portion 19 of the hub is preferably larger in diameter than the nominal inside diameter 20 of the flexible element while the end portion 22 of the hub has a smaller diameter than the nominal diameter of the flexible element for reasons which will later become apparent. The tapered end portion 22 of the hub 12 may be extended to form or adapted to receive a centering device, not shown. Preferably, the hub 12 includes an axial bore 24 or axial reference portion to serve as an alignment means. The edge of the flange is preferably fluted 26 for purposes, which will later be explained. The hub is easily fabricated using known machining methods and techniques.

The outer sleeve 14 may be cold formed from a piece of straight tubing of predetermined length. In forming the sleeve, portions of the sleeve are first crimped radially inward to form a corrugated sleeve, the number of crimps or corrugations 28 preferably corresponding to the number of axial grooves 18 in the hub. Both ends of the corrugated sleeve 14 are flared 30, 32 radially outward and the hub is inserted into the uncrimped end of the sleeve so the flange 26 bottoms against the flared end 32. The end portion of the sleeve is then curled and crimped around the flange, FIG. 3, or attached, FIG. 4, to hold the corrugated sleeve 14 in coaxial alignment with the hub 22. The tapered hub 22 in combination with the corrugated sleeve 14 define a divergent annulus 34 for receiving a flexible element 15.

The sleeve 14 is attached to the hub 12 to preclude relative movement therebetween. The corrugated sleeve 14 may be fastened in any desirable manner such as by welding, riveting 36, or adhering. More preferably, the hub 12 and corrugated sleeve 14 are held in a fixed relationship by means of: the fluted edge 26 of the flange 16, the corrugations 28, and the end crimp around the flange 26 as seen in FIG. 2.

The fluted edge 26 of the flange has four significant functions. The flutes 26 are circumferentially aligned to index the hub 12 and corrugated sleeve 14 so the grooves 18 of the hub are radially aligned with the radially inward corrugations 28 of the sleeve. The flutes 26 nest with inward corrugations 28 to index and axially align the hub 12 in relation to the corrugated sleeve 14. Furthermore, the fluted edge 26 is interlocked with the radially inward corrugations in a "pseudo" spline fashion to preclude relative motion between the parts.

Once the hub 12 and corrugated sleeve 14 are preassembled, they are ready for attachment to a flexible element 15. As previously brought forth, the root diameter of the hub is larger than the internal diameter of the tubularly shaped flexible element. The hub 12 is pressed into the flexible element 15 which causes the end portion of the element to flare radially outward in an undulating fashion into the corrugations of the sleeve. An alignment fixture may be positioned in the axial bore 24 of the hub to facilitate axial alignment between the end cap 10 and flexible element 15. The outer sleeve 14 corrugations 28 are then further crimped radially inward which further distorts the flexible element 15 in an undulating fashion between the grooves 18 of the hub and the corrugations of the sleeve. The degree of undulation in the end portion of the flexible element varies in accordance with the divergence of the annular groove 34 as defined by the tapered hub and corrugated sleeve. Torque is transmitted from the end cap to the flexible element in varying amounts as controlled by the degree of undulation in the end portion and the divergence of the annulus 34. A larger percentage of the torque is transmitted to the flexible element near the root 19 of the tapered hub whereas a minimum amount of torque is transmitted at the end portion 22 of the tapered hub. Thus, there is no stress concentrations imparted to the flexible element at the termination point of the end cap. The sharper taper near the end portion 22 of the hub and the flared end 30 of the corrugated sleeve combine to alleviate stress concentrations when the flexible element is bent during operation.

The foregoing detailed description is made for purpose of illustration only and is not intended to limit the scope of the invention which is to be determined from the appended claims.

What is claimed is:

1. An end cap for use with a tubularly shaped flexible element comprising:
   a flanged hub tapered substantially throughout its length and having a plurality of spaced axially aligned convex grooves; and
   a corrugated sleeve axially aligned with and spaced radially away from said tapered hub to define a generally divergent and undulating annulus for receiving the flexible element, said sleeve having one end flared radially outward and the other end attached to said flange in such a manner to hold said sleeve in juxtaposed axial alignment with said hub.

2. An end cap as set forth in claim 1 and further including means on said hub for aligning said hub axially with said corrugated sleeve.

3. An end cap as set forth in claim 1 and further including means for adapting the sleeve and end cap to a rotatable shaft.

4. An end cap as set forth in claim 1 wherein the maximum diameter of the tapered hub is a predetermined amount greater than the minimum internal diameter of the flexible element.

5. An end cap as set forth in claim 1 wherein one end portion is flared radially outward, curled and crimped radially inward around said flange in such a manner to hold said sleeve in juxtaposed axial alignment with said hub.

6. An end cap for use with a tubularly shaped flexible element comprising:
   a flanged tapered hub having a plurality of spaced axially aligned grooves, said flange having a fluted circumferential edge; and
   a corrugated sleeve axially aligned with and spaced radially away from said tapered hub to define a generally divergent annulus for receiving the flexible element, said sleeve having one end flared radially outward and the other end attached to said flange in such a manner to hold said sleeve in juxtaposed axial alignment with said hub.

7. An end cap as set forth in claim 6 wherein said flange has at least the same number of flutes at an angular spacing substantially equal to the spacing of the corrugations and wherein a portion of the corrugations partially extend into a portion of the flutes to further interlock said flange and corrugated sleeve.

8. An end cap for use with a tubularly shaped flexible element comprising:
   a flanged tapered hub having a plurality of spaced axially aligned grooves; and
   a corrugated sleeve axially aligned with and spaced radially away from said tapered hub to define a generally divergent annulus for receiving the flexible element, the number of axial grooves corresponding to the number of corrugations and the radially inward extending portions of the corrugations in radial alignment with the grooves, said sleeve having one end flared radially outward and the other end attached to said flange in such a manner to hold said sleeve in juxtaposed axial alignment with said hub.

9. An end cap adapted for use with a tubularly shaped flexible element having an internal diameter, said end cap comprising:
   a hub tapered substantially throughout its length and having a plurality of spaced axially aligned convex grooves, the largest portion of the tapered hub having a diameter that is larger than the nominal inside diameter of the flexible element;
   a corrugated sleeve axially aligned with and spaced radially away from said tapered hub to define a generally divergent and undulating annulus with the hub for receiving the flexible element; and
   means for attaching the sleeve to the hub in such a manner to hold said sleeve in juxtaposed axial alignment with said hub;
   whereby the tapered hub in combination with the corrugated sleeve flare end portions of the element radially outward in undulating fashion securing the hub and sleeve to the flexible element.

10. A method of making an end cap comprising the steps of:
   forming a flanged hub tapered substantially throughout its length and having a plurality of spaced convex axial grooves;
   corrugating a major portion of tubing of predetermined length and diameter;
   flaring both end portions of the tub radially outward; and
   curling and crimping one end portion around the flange in such a manner to position the corrugated sleeve radially away from and in substantially axial alignment with the hub.

* * * * *